United States Patent
Gendlin et al.

(10) Patent No.: US 9,368,773 B2
(45) Date of Patent: Jun. 14, 2016

(54) BATTERY CELL MODULE, METHOD FOR PRODUCING A BATTERY CELL MODULE, BATTERY AND MOTOR VEHICLE

(75) Inventors: Boris Gendlin, Filderstadt (DE); Michael Gless, Stuttgart-Zazenhausen (DE); Ralf Angerbauer, Möglingen (DE); Conrad Bubeck, Esslingen (DE); Stefan Baumann, Altenriet (DE); Andreas Ruehle, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 316 days.

(21) Appl. No.: 13/978,989

(22) PCT Filed: Nov. 14, 2011

(86) PCT No.: PCT/EP2011/069999
§ 371 (c)(1), (2), (4) Date: Sep. 16, 2013

(87) PCT Pub. No.: WO2012/095201
PCT Pub. Date: Jul. 19, 2012

(65) Prior Publication Data
US 2014/0023896 A1    Jan. 23, 2014

(30) Foreign Application Priority Data
Jan. 13, 2011    (DE) .......................... 10 2011 002 631

(51) Int. Cl.
*H01M 2/12* (2006.01)
*H01M 2/04* (2006.01)

(52) U.S. Cl.
CPC ............ *H01M 2/1264* (2013.01); *H01M 2/043* (2013.01); *H01M 2/1205* (2013.01); *Y10T 29/49108* (2015.01)

(58) Field of Classification Search
CPC ....................................................... H01M 2/08
See application file for complete search history.

(56) References Cited

U.S. PATENT DOCUMENTS

| | | | |
|---|---|---|---|
| 5,281,492 A | 1/1994 | Lin | |
| 6,399,238 B1 * | 6/2002 | Oweis | H01M 2/1077 429/100 |

FOREIGN PATENT DOCUMENTS

| | | |
|---|---|---|
| CH | 305227 | 4/1955 |
| DE | 102 57 918 A1 | 6/2003 |
| DE | 20 2004 004 335 U1 | 7/2004 |
| WO | 2010/067602 A1 | 6/2010 |

OTHER PUBLICATIONS

International Search Report corresponding to PCT Application No. PCT/EP2011/069999, mailed Feb. 9, 2012 (German and English language document) (5 pages).

* cited by examiner

*Primary Examiner* — Jacob Marks
(74) *Attorney, Agent, or Firm* — Maginot, Moore & Beck LLP

(57) ABSTRACT

The disclosure relates to a battery cell module including a plurality of lithium ion battery cells, each having a degassing opening, and a cover substantially sealingly connected to a corresponding surface of each of the battery cells. The cover defines a gas receiving space configured to at least temporarily receive gas escaping from the battery cells. The gas receiving space is open in the direction of the battery cells. The opening area of the gas receiving space extends across a plurality of the battery cells. The disclosure further relates to a method for producing a battery cell module, to a battery, and to a motor vehicle having the battery cell module or the battery.

9 Claims, 2 Drawing Sheets

BATTERY CELL MODULE, METHOD FOR PRODUCING A BATTERY CELL MODULE, BATTERY AND MOTOR VEHICLE

This application is a 35 U.S.C. §371 National Stage Application of PCT/EP2011/069999, filed on Nov. 14, 2011, which claims the benefit of priority to Serial No. DE 10 2011 002 631.2, filed on Jan. 13, 2011 in Germany, the disclosures of which are incorporated herein by reference in their entirety.

The present disclosure relates to battery cell module, which comprises a plurality of battery cells, in particular lithium-ion battery cells, the battery cells each having a degassing opening. The battery cell module further comprises a gas receiving space for receiving gas escaping from the battery cells. In addition, the present disclosure relates to a method of assembly for producing a battery cell module according to the disclosure, and to a battery, which comprises multiple battery cell modules according to the disclosure, and to a motor vehicle.

BACKGROUND

Battery cells and in particular lithium-ion battery cells often have a so-called degassing opening, which prevents the occurrence of an inadmissible overpressure inside the battery cell in that, in excess of a specific internal pressure, it opens the casing, so that gases can escape from the battery cell casing into the surroundings. Here such degassing openings may be designed as a predetermined breaking-point. The gases escaping contain electrolyte and react with water to form hydrofluoric acid. In order to prevent hazards for equipment and persons, it is necessary to discharge gas escaping from the battery cells in a controlled and purposeful manner.

The gas is often caught and discharged by a so-called module cover, which is arranged on the battery cell module.

DE 20 2004 004 335 U1 in this context discloses a degassing system for accumulators, in which escaping gas must flow through a labyrinth, in order to remove solids and liquids before the gas passes into a so-called gas escape chamber in the cover. This development is associated with a relatively high design outlay and accordingly also with a production engineering cost.

DE 102 57 918 B4 discloses an accumulator, on which a so-called block cover is arranged, which in turn comprises an upper cover and a lower cover. A number of gas spaces for separation of the acid, corresponding to each of the battery cells, are arranged in the block cover. Implementation of the design makes this embodiment of a gas receiving cover also relatively elaborate and cost-intensive to produce and assemble, especially in large quantities.

SUMMARY

According to the disclosure a battery cell module is provided, which comprises a plurality of battery cells, in particular lithium-ion battery cells, each of the battery cells having a degassing opening. The battery cell module further comprises a cover, which is connected to a surface of each of the battery cells, substantially forming a seal, and which comprises a gas receiving space for at least temporarily receiving gas escaping from the battery cells, the gas receiving space being open in the direction of the battery cells. According to the disclosure the opening area of the gas receiving space extends over a plurality of battery cells. The cover is preferably sealed off completely from the surfaces of the battery cells, that is to say sealed off so that it is at least fluid-tight, and in a preferred embodiment completely gas-tight. The cover bears tightly on a plurality of battery cells, the same opening area being arranged over multiple battery cells, so that the gas escaping from these multiple battery cells is able to pass through the same opening area into the gas receiving space of the cover. Here the sealing is achieved by a suitable sealing element on the cover and/or on the battery cells, for example by an expanded rubber seal. The surfaces of the battery cells on which the cover bears are preferably the respective cover surfaces of the battery cells from which the terminals protrude.

The advantage of the battery cell module according to the disclosure lies particularly in the fact that the gas receiving space has a relatively large opening area, which spans multiple battery cells and their degassing openings, so that the gas escaping from these battery cells can readily pass through the relatively large opening area into the gas receiving space. Individual ducts for carrying the gas flowing out of the battery cells into the gas receiving space are therefore no longer required, so that the cover, in particular, of the battery cell module is easier and more cost-effective to produce and assemble.

The cover is preferably of single-wall design, the gas receiving space in the cover being formed by an in part substantially concave design. In particular, such a cover is very easy to achieve in production engineering terms. Here the disclosure is not limited to the single-wall design of the cover; rather the cover can also be designed in such a way that it is built up from multiple layers. Such a multi-layered cover also has the feature that the gas receiving space formed by the cover is open in the direction of the battery cells, so that gas escaping from the battery cells is able to pass unimpeded via the battery cells into the gas receiving space, where it can first be collected and then discharged.

The concave design mentioned is also taken to mean an angular defined space, which substantially has a three-dimensional expanse in the direction remote from the battery cells. This concave design can be achieved by forming a single-layer cover material or also by removing solid material from the cover material, so that the gas receiving space is formed in the solid material of the cover.

The surface spanned by the opening area preferably corresponds to the area of the projection of the gas receiving space onto the surfaces of the battery cells overlain by the cover. The projection here refers to a perpendicular projection onto the surfaces overlain by the cover. That is to say the maximum width and length of the gas receiving space substantially defines the area of the opening of the gas receiving space in the direction of the battery cells. In other words, the maximum cross-sectional area of the gas receiving space is that of the opening area. The disclosure is not limited to such a design, however, it also being possible instead to design the battery cell module in such a way that the surface of the battery cells spanned by the opening area is smaller than the area of the projection of the gas receiving space onto the surfaces sealed off by the cover.

For leading off the gas received in the gas receiving space, the latter has at least one outlet opening. From the outlet opening, in a preferred development a connecting device is provided for the connection of a line, such has a hose, for example, in order to carry the gas that has escaped away from the battery cell module and to release it into the surroundings purposely where the gas does not present any hazard. The connecting device may take the form of a T-shape pipe connection, the two equidirectional pipe fittings of which are each designed for the connection of a hose, so that multiple connecting devices can easily be connected to one another in series, thereby reducing the outlay for discharging the gases from multiple battery cells.

In the event of an overpressure in a battery cell, its degassing opening opens so that gas passes from the battery cell into the gas receiving space. This overpressure causes the gas, once received in the gas receiving space, to be carried away from the battery cell through the connecting device.

In order to provide a simple and effective seal, the battery cells are preferably contiguous with one another, or intermediate layers are arranged between the battery cells, so that a substantially uninterrupted surface of the battery cell module is formed in the area of the battery cells, on which the sealing cover rests. That is to say there are no intervals between the battery cells that are not filled by solid and sealable material, so that the gas receiving space spanning multiple battery cells and the opening area thereof can be sealed off from the battery cells. This design according to the disclosure obviates the need to arrange the battery cells of a module in an extra casing, since the design with an uninterrupted surface makes it possible to seal off the gas receiving space open at the bottom.

Production engineering advantages likewise accrue and a weight reduction is achieved in that according to the disclosure the battery cell module need no longer have a casing.

In an advantageous development of the battery cell module according to the disclosure the cover has a plurality of holes, through which terminals of the battery cells are led. These holes are obviously arranged outside the gas receiving space.

In a further preferred development profiled elements, which produce a profiling of the cover between adjacent holes, are arranged on the side of the cover remote from the battery cells and between holes. These profiled elements may be so-called separating webs, for example, which profile the cover surface in such a way that a cell connector of substantially two-dimensional design is no longer capable of connecting together specific terminals, which lead through two adjacent holes with the profiled element situated between them, or in such a way that this cell connector, at least when it is connecting these terminals, cannot rest flat on the cover surface in the vicinity of the holes, since it is separated from the cover surface by the profiled element. This gives a fitter a simple and efficient means for preventing fitting errors with regard to the positioning and connection of terminals and the electrical circuit of the battery cells, since the profiled elements make it impossible or at least difficult to connect terminals that should not be in contact with one another. That is to say the design of the cover with the profiled elements achieves a so-called poka-yoke effect. The number of holes in the cover preferably corresponds to the number of battery cell terminals of the battery cell module to be electrically connected to one another.

The battery cell module according to the disclosure is further designed for ease of production and assembly if the battery cell module comprises a plurality of cell connectors, which connect the terminals of each two battery cells together, the cover being arranged between the cell connectors and casings of the battery cells. That is to say in this case the battery cell module is constructed in such a way that the cover is arranged on the battery cells or the casings thereof and the cell connectors, which connect the terminals of the battery cells, which protrude through holes in the cover, are in turn arranged on this cover.

According to the disclosure a method is also provided for producing a battery cell module in the last-mentioned embodiment, in which method a cover, substantially forming a seal, is mounted on that side of multiple battery cells, combined into a block, on which the terminals of the battery cells are situated, so that terminals of the battery cells pass through holes in the cover and terminals of the battery cells are then connected by cell connectors. Here the side of the battery cells on which the terminals of the battery cells are situated is also the side on which the degassing openings of the battery cells are situated. If the battery cell module is designed with the profiled elements, only terminals with no profiled element arranged between them can be connected together by the cell connectors, thereby preventing misconnection of the individual battery cells.

According to the disclosure a battery, in particular a lithium-ion battery, is also provided, which comprises a plurality of battery cell modules according to the disclosure, the battery cell modules being arranged in an overall casing and outlet openings of the battery cell modules being flow-connected to a degassing line, which is connected to a gas outlet in the overall casing. That is to say each individual battery cell module does not have a casing, but the battery cell modules are arranged in an overall casing enclosing all battery cell modules. The respective outlet openings, which are connected to the gas receiving space of the battery cell modules, are flow-connected to at least one degassing line, which serves to carry the gas that has escaped from the battery cells until it can be discharged from a gas outlet, which is arranged in the overall casing, into the surroundings in a purposeful and controlled manner.

According to the disclosure a motor vehicle, in particular a motor vehicle powered by an electric motor, is also provided, which comprises at least one battery cell module according to the disclosure or a battery according to the disclosure, the battery cell module or the battery being connected to a propulsion system of the motor vehicle.

The design of the battery cell module according to the disclosure and also of the battery allows reliable collection and leading off of any gases produced in the battery cells. At the same time the battery cell module according to the disclosure and also the battery are technically easy to produce and assemble and can be manufactured with greater safeguards against assembly error.

BRIEF DESCRIPTION OF THE DRAWINGS

The disclosure is explained below with reference to the exemplary embodiments represented in the drawings attached, of which.

DETAILED DESCRIPTION

Figure 1:
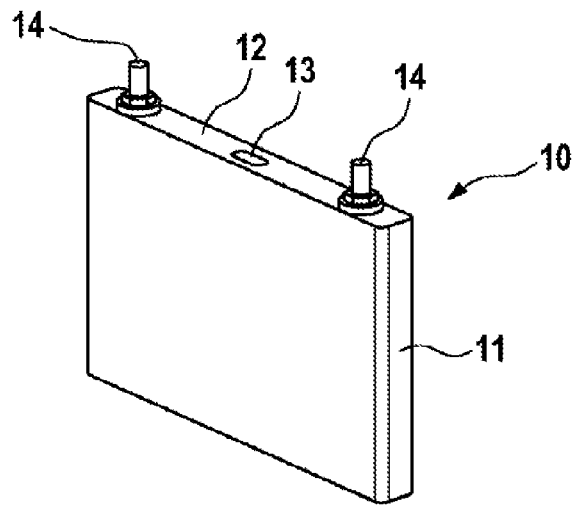
FIG. 1 shows a perspective view of a battery cell

FIG. 1 represents the battery cell 10 preferably used in the battery cell module according to the disclosure. This battery cell 10 comprises a battery cell casing 11, on the upper side of which, where the terminals 14 are also arranged, the surface 12 spanned by the opening area of the cover 20 is arranged. Also situated in this surface 12 is the degassing opening 13, which may be designed as a predetermined breaking-point, for example, or as a relief valve, in order to release gas from the battery cell casing 11 in the event of an inadmissible overpressure in the battery cell 10.

Figure 2:
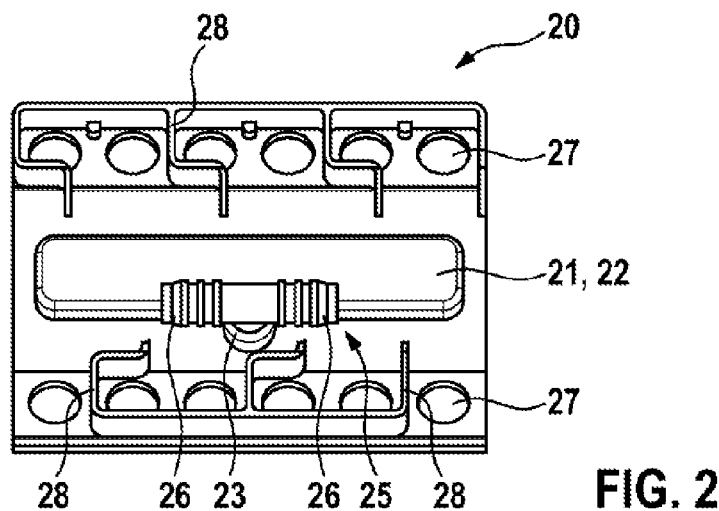
FIG. 2 shows a top view of a cover
Figure 3:
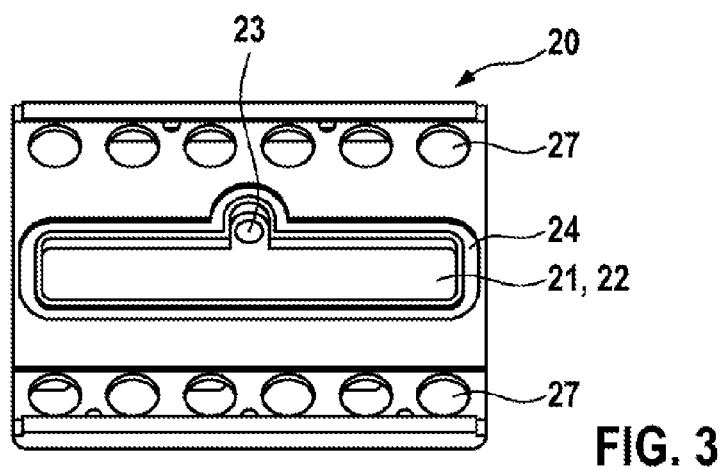
FIG. 3 shows a view of a cover from below

FIGS. 2 and 3 represent a cover 20 of the battery cell module according to the disclosure. It can be seen that that this cover 20 is of a substantially rectangular shape, the gas receiving space 21, here embodied as a concave curvature of the single-layer casing material, being arranged in the central area. It can be seen here, particularly from FIG. 3, that the gas receiving space 21 is open towards the bottom, so that an opening area 22 is formed, which has the contour of the gas receiving space 21. It can likewise clearly be seen from FIG. 3 that an outlet opening 23 adjoins the gas receiving space 21. Connected to this outlet opening 23, as can be seen from FIG. 2, is a tubular connecting device 25, which is embodied as a T-piece. This connecting device 25 has two pipe fittings 26 pointing away from one another for the connection of further connecting lines.

Figure 4:
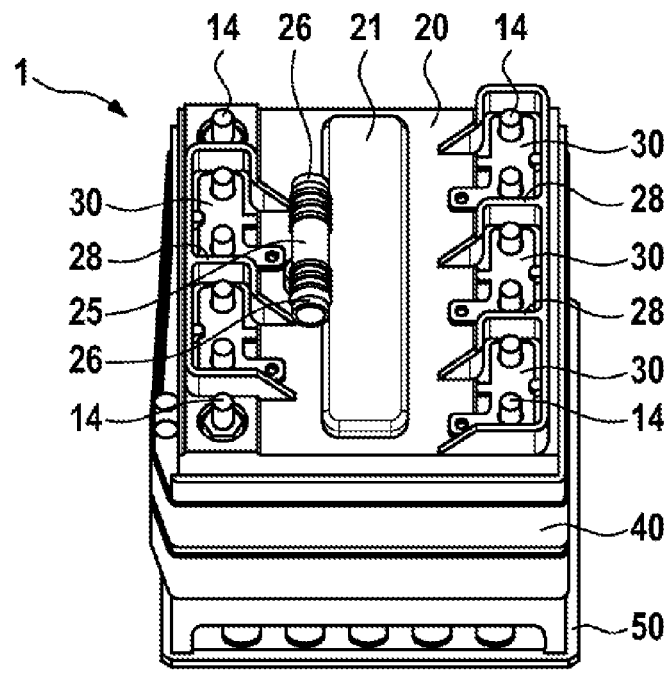
FIG. 4 shows a perspective view of a battery cell module according to the disclosure.

As represented in FIG. 3, a sealing element 24 bordering the opening area 22 is arranged on the cover 20.

Where the cover 20 is arranged on a plurality of battery cells 10, as can be seen from the protruding terminals 14 in FIG. 4, the gas receiving space 21 and hence also the opening area 22 spans the battery cells 10 transversely, so that the gas receiving space 21 and the opening area 22 runs substantially over the degassing openings 13 of the battery cells 10 represented in FIG. 1. When a degassing opening 13 opens the gas passes through the opening area 22 into the gas receiving space 21. A lateral outflow of the gas is prevented by the sealing afforded by means of the sealing element 24. Forming the battery cell module with a plane surface below the opening area 22 improves the sealing action provided by the sealing element 24.

The gas received in the gas receiving space 21 is able to pass through the outlet opening 23 visible in FIG. 3 into the connecting device 25 and its pipe fittings 26, so that the gas can be carried away from the battery cell module 1 through lines (not shown) on these pipe fittings 26. The volumetric flow of the gas occurs due to the relatively large overpressure of the gas escaping.

It can also be seen from FIGS. 2 and 3 that the cover 20 has a plurality of holes 27 arranged on each side. The number of holes corresponds to the number of terminals 14 of the battery cells 10 to be circuit-connected. It can be seen from FIG. 4 that the terminals 14 protrude through the holes 27. Arranged between the various holes 27 and terminals 14 here are profiled elements 28 in the form of so-called separating webs, which prevent cell connectors 30 being connected to terminals 14 not designed for any electrical connection. That is to say the arrangement of the profiled elements 28 allows the cell connectors 30 to connect together only the terminals 14 actually intended for any electrical circuit contact. Errors in manual or automated assembly can therefore be avoided.

Figure 5:
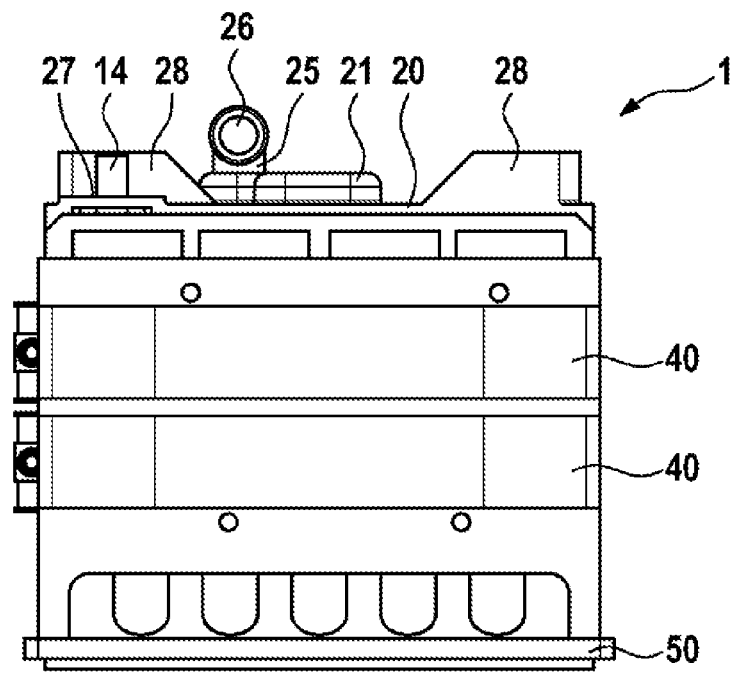
FIG. 5 shows a side view of a battery cell module according to the disclosure.

FIG. 5 represents a side view of a battery cell module 1 according to the disclosure, clearly showing the form of the pipe fitting 26 for the connection of a degassing line and the concave curvature of the gas receiving space 21. It can further be seen that the profiled elements 28 are arranged higher that the terminals 14 when the cover 20 is seated on the battery cells 10, so that incorrect connection of the terminals 14 by cell connectors 30 is prevented.

It can be seen from FIG. 5 that the battery cell module need not have an extra casing in order to achieve a sealing arrangement of the cover 20 on the battery cells 10. The only provision made for positioning and fixing the battery cells 10 together are clamping straps 40, which bring the battery cells 10 together to form a module, which is arranged on a base plate 50.

The invention claimed is:

1. A battery cell module, comprising:
   a plurality of lithium-ion battery cells, each battery cell of the plurality of lithium-ion battery cells defining a degassing opening and a surface, and
   a cover connected to the surface of each battery cell, the cover being configured (i) to substantially form a seal on said surface, and (ii) to define a gas receiving space configured to at least temporarily receive gas escaping from the battery cells of the plurality of lithium-ion battery cells,
   wherein the gas receiving space is open in a direction of the battery cells of the plurality of lithium-ion battery cells and closed in a direction opposite said battery cells, and
   wherein an opening area of the gas receiving space is configured to extend over at least two battery cells of the plurality of lithium-ion battery cells.

2. The battery cell module as claimed in claim 1, wherein:
   the cover includes a single-wall structure, and
   the gas receiving space is formed by an in part substantially concave structure.

3. The battery cell module as claimed in claim 1, wherein a surface spanned by the opening area corresponds to an area of a projection of the gas receiving space onto the surfaces of the battery cells overlain by the cover.

4. The battery cell module as claimed in claim 1, wherein the gas receiving space defines an outlet opening configured to lead off the gas received.

5. The battery cell module as claimed in claim 1, wherein the battery cells of the plurality of lithium-ion battery cells are contiguous with each another, or intermediate layers are arranged between the battery cells, so that a substantially uninterrupted surface of the battery cell module is formed in an area of the battery cells, on which the cover rests.

6. The battery cell module as claimed in claim 1, wherein the cover (i) defines a plurality of holes, through which terminals of the battery cells are led, and (ii) includes profiled elements configured to produce a profiling of the cover between adjacent holes of the plurality of holes, and are arranged on a side of the cover remote from the battery cells and between the holes of the plurality of holes.

7. The battery cell module as claimed in claim 6, further comprising:
   a plurality of cell connectors configured to connect together the terminals of each two battery cells of the plurality of lithium-ion battery cells,
   wherein each of the plurality of battery cells has a casing and the cover is arranged between the plurality of cell connectors and the casings of the battery cells of the plurality of lithium-ion battery cells.

8. A lithium-ion battery, comprising:
   a plurality of battery cell modules located in an overall casing and defining outlet openings, the outlet openings of the plurality of battery cell modules being flow-connected to a degassing line, which is connected to a gas outlet in the overall casing,
   wherein each battery cell module of the plurality of battery cell modules includes a plurality of lithium-ion battery cells,
   wherein each battery cell of the plurality of lithium-ion battery cells defines a degassing opening and a surface, and said battery cell module includes a cover connected to the surface of each battery cell, the cover being configured (i) to substantially form a seal on said surface, and (ii) to define a gas receiving space configured to at least temporarily receive gas escaping from the battery cells of the plurality of lithium-ion battery cells, wherein the gas receiving space is open in a direction of the battery cells of the plurality of lithium-ion battery cells and closed in a direction opposite said battery cells, and wherein an opening area of the gas receiving space is configured to extend over at least two battery cells of the plurality of lithium-ion battery cells.

9. The lithium-ion battery as claimed in claim 8, wherein the lithium-ion battery is connected to a propulsion system of a motor vehicle.

* * * * *